Patented Aug. 11, 1953

2,648,597

UNITED STATES PATENT OFFICE 2,648,597

CHEMICAL PROCESS

Morris L. Nielsen, Centerville, Ohio, assignor to Monsanto Chemical Company, St. Louis, Mo., a corporation of Delaware No Drawing. Application March 24, 1951, Serial No. 217,403

4 Claims. (Cl. 23—190)

This invention relates to a process for the improvement of water-soluble, nitrogen-phosphorus-containing compounds. Such compounds are of utility in flameproofing compositions.

It has been found that the reaction product of phosphorus oxychloride and ammonia as prepared at temperatures below 100° followed by heat treatment at temperatures in the range of 110–150° is obtained as a water-soluble, phosphorus-nitrogen-containing product which, after the removal of ammonium chloride, is substantially neutral or slightly alkaline so that such materials may be applied to fabrics without deterioration of fibers forming the fabric. These chemical compositions are described in copending application Serial No. 169,513, filed June 21, 1950, assigned to the same assignee as is the present application.

It has now been discovered that such phosphorus-nitrogen condensation products may be improved in flameproofing properties by the treatment thereof with an organic acid. It has been found that any carboxylic acid having from 2 to 4 carbon atoms may be employed for this purpose, a preferred acid being acetic acid. The acids may be employed in anhydrous form, or in solution such as in water. The phosphorus-nitrogen condensation product may be contacted with the acid at any desired concentration, although a preferred range is 25% to 100% of the acid in water and at such temperatures and pressures as may be desired since these are not critical variables. The phosphorus-nitrogen composition is water-soluble, so that it may also be used in aqueous solution in the present process. The proportion of acid relative to the phosphorus-nitrogen compound may be varied widely, although it is preferred to employ at least 25% by weight of the acid relative to the composition to be treated.

The phosphorus-nitrogen condensation product in the form of a white powder may be added to a vat of the acid while stirring the mixture. After such contacting, the acid may be withdrawn by filtration, leaving the modified phosphorus-nitrogen condensation product behind. The damp material may then be dried or may be washed with methanol or acetone to remove water and residual acid. However, solutions of the phosphorus-nitrogen compound may also be employed in the present process. Such solutions using water as a solvent may be contacted with the organic acid to precipitate the acid-insoluble material which exhibits superior properties as set forth in the examples below.

The phosphorus-nitrogen compound may be prepared by the reaction of anhydrous ammonia with phosphorus oxychloride in a solvent. The phosphorus oxychloride so dissolved is then reacted with ammonia in gaseous or liquid form with suitable agitation. The temperature should be maintained below 100° C. during the addition of the ammonia. However, after the addition of at least the stoichiometric proportion of ammonia (5 moles per mole of $POCl_3$) the temperature is raised and the product heated to at least 110° C. but not above 150° C. It has been found that the temperature control within the above limits is essential to prevent the formation of a water-insoluble product on the one hand, and on the other hand to alter the intermediate product so that the subsequent separation and purification steps can be carried out successfully. The reaction of phosphorus oxychloride with anhydrous ammonia, followed by heating the reaction product to at least 110° C., but not above 150° C., yields the desired composition in a form insoluble in liquid anhydrous ammonia. Ammonium chloride is formed as a by-product by reaction of ammonia with the chlorine present in the phosphorus oxychloride. As a result of the conditions under which the present product is prepared, it has been found to be possible to form the nitrogen-phosphorus product so that it possesses solubility characteristics enabling the subsequent separation of the product from the ammonium chloride to be carried out by differential solubility methods. At the same time the desired product is obtained in a form which is highly reactive with cellulose.

In order to show in further detail the method of preparing the phosphorus-nitrogen compound, the following process illustrates the procedure. Phosphorus oxychloride to the amount of 90 pounds is dissolved in 90 gallons of hexane contained in an autoclave. The solution is heated to approximately 55° C. while stirring, and gaseous anhydrous ammonia is added thereto. Although an exothermic reaction takes place, the reaction may be carried out at about 75° C. by cooling the vessel. Ammonia to the extent of 50 pounds (5 moles per mole of phosphorus oxychloride) is added to the autoclave over a two hour period. An excess of ammonia may be used. After the addition of this amount of ammonia, the autoclave is sealed and then heated to about 130° C. for approximately 1½ hours. After the completion of the heating period, the reaction mixture is cooled to below 40° C. and then transferred to a second vessel containing a filter element and provided with external heating means.

By applying heat to the autoclave contents the hexane present is distilled off, condensed and recovered. The remaining solids which consist of a mixture of the nitrogen- and phosphorus-containing product with ammonium chloride are then extracted under pressure with anhydrous ammonia at about room temperature. A total of about 20 pounds of ammonia per pound of final product is employed, although it is also possible to carry out an extraction with 10 pounds of ammonia per pound of product. The slurry of product in anhydrous liquid ammonia was filtered by means of a filtering device contained within the autoclave. In this manner, substantially all of the ammonium chloride is leached from the residual solids. After the last extraction the residual ammonia adhering to the product is removed by evaporation induced by the application of heat to the product. The yield of the nitrogen-phosphorus product obtained is approximately 85% of the theoretical. The product contains 33.8% nitrogen, 35.1% phosphorus, N/P ratio=2.14.

The temperature at which the initial reaction of ammonia and phosphorus oxychloride is carried out should be maintained below 100° C. Apparently there is no lower limit to this temperature since the reaction has been successfully carried out at extremely low temperatures. However, the subsequent heating of the first-formed reaction product should be carried out at a temperature of at least 110° C., but not in excess of 150° C. Moreover, the temperatures within this range are somewhat dependent upon the time of heating the product; at the higher temperatures the time is shorter, while at lower temperatures the time is correspondingly longer. Thus when employing temperatures as high as 150° C., the time of heating should not be substantially in excess of 30 minutes. When employing temperatures as low as 110° C., the time of heating should be at least six hours, since the initial nitrogen-phosphorus-containing product is soluble in liquid anhydrous ammonia while the product which has been heated within the above range of temperatures is insoluble in this same solvent. The correct time of heating at any temperature may be readily determined by observation of the solubility property.

The nature of the nitrogen-phosphorus-containing product has not been completely determined, but it would appear that the product consists of a mixture of closely related compounds probably containing the group:

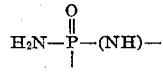

However, the compounds present in the mixture contain additional radicals, since the phosphorus-nitrogen ratio of our products is greater than 2.0, being in the range of from 2.1 to 2.3, depending upon the temperature employed in the heating step. The molecular weight of the nitrogen-phosphorus product as determined cryoscopically is in the range of from 180 to 300, a preferred range being from 200 to 250.

The product so obtained is soluble in water, the pH thereof being in the range of from 7.0 to 8.5.

The following examples illustrate certain embodiments of the present invention:

EXAMPLE 1

To a solution containing 80 ml. of water and 20 g. of the water-soluble phosphorus-nitrogen-containing condensation product prepared in accordance with the above method, there was added 100 ml. of glacial acetic acid. The solution was stirred to mix the components and was then allowed to stand for one hour. It was found that the phosphorus-nitrogen condensation product was partially insoluble in the acetic acid solution so that the insoluble material could be filtered off leaving the acid-soluble components in solution. The filter cake obtained from the filtration step was then washed with dilute acetic acid and was then further washed with methanol to remove all of the acid and aid in drying the material.

The product obtained was modified from the starting material inasmuch as the pH showed a more acidic product, after all of the acid reagent had been removed. The pH of the final product was found to lie in the range of 4 to 6 as contrasted to the alkaline material previous to the treatment with the organic acid.

EXAMPLE 2

The product obtained in Example 1 was dissolved in water to give a 20% solution. This solution was applied to cotton cloth by padding to obtain an 80% pick-up to give a 16% dry add-on. The treated cotton was then dried and cured at 140–150° C. for 10 minutes. The treated material was wash-fast and was found to be flame-resistant even after repeated washings. The flame-resistance test was carried out in accordance with the method described by R. W. Little in Flameproofing Textile Material, pages 111–115 (Reinhold Publishing Co., 1947). The material was also found to resist tendering better than conventional flame-resisting treatments.

EXAMPLE 3

A sample of sheeting-weight cotton cloth was treated as described in Example 2 with a similar solution of the acid-insoluble phosphorus-nitrogen condensation product of Example 1. By employing a similar wet pick-up it was found that an add-on of about 17% (dry basis) was readily obtained. The wet material was dried and was then cured at 140° C. for ten minutes. The treated material withstood the conventional flame-resistance treatment as described above. The treated material was also tested to determine its tear strength. It was found that the tear strength as carried out under standard conditions was 1360 grams. A control sample not subjected to the present treatment when tested under the same conditions gave a warp strength of 1232 grams, showing that the treated material in addition to being flame-resistant also exhibited an increase in strength over the original material.

EXAMPLE 4

A sample of sheeting-weight cotton cloth was impregnated with the acid-extracted phosphorus-nitrogen condensation product as described above and was then cured at a temperature of 150° C. for five minutes as having been previously dried. It was found that this material withstood the standard test for flame-resistance and also showed an increase in strength over the original material. The warp tear strength was 1376 grams as contrasted to a control sample (Control A) which had a warp strength of 1232 grams without the treatment of the present example.

EXAMPLE 5

In order to show the improvement in the nitrogen-phosphorus condensation product as a result of the acid extraction, a test was conducted in which another sample of sheeting-weight cotton was impregnated with the unextracted phosphorus-nitrogen condensation product. Such condensation product, without having been treated with acid, was utilized as a 20% aqueous solution and was impregnated to the extent of 16% to 18% add-on (dry basis). The treated material was then dried and cured at 140° C. for ten minutes. The fabric was then tested and was found to pass the test for flame-resistance but was found to have a lower tear strength. The warp strength of a sample was found to be 1168 grams in contrast to a control strip (Control B) not subjected to any chemical treatment and having a warp strength of 1296 grams.

The above test data are summarized in the table below. It is seen that there is an improvement in the properties of the cotton when the phosphorus-nitrogen compound has been acid-treated since the treated cotton fabric shows less of a tendering effect and in certain of the examples exhibits an increase in strength as compared to the original untreated material.

TABLE

*Tear strength relationship to treatment*

| Sample | Warp Strength (g.) |
| --- | --- |
| Control A | 1,232 |
| Ex. 3 | 1,360 |
| Ex. 4 | 1,376 |
| Control B | 1,296 |
| Ex. 5 | 1,168 |

EXAMPLE 6

In order to show the variation which may be effected in the acid concentration of the present process a series of tests was conducted in which acetic acid-water solutions were prepared in the range of from 25% to 100% acetic acid. These solutions were mixed with portions of the water-soluble, nitrogen-phosphorus condensation product described above. The solutions were agitated and were then filtered to remove the acid-soluble portion from the insoluble product. It was found that the recovery was good in each case and a product obtained which was effective in the treatment of cellulosic materials to impart the property of fire-resistance.

The product obtained with the various acid treatments was useful in the flameproofing of cellulosic material such as cotton. The data representative of typical examples of acid concentrations are set forth below:

| Percent Acid By Weight | Percent Recovery |
| --- | --- |
| 70 | 93 |
| 60 | 88 |
| 50 | 78 |
| 40 | 66 |
| 30 | 60 |

EXAMPLE 7

A treatment was carried out similarly to Example 1 employing propionic acid in 100% concentration and also in 50% concentration with water. The phosphorus-nitrogen condensation product described above was contacted with the propionic acid solutions and was found to yield a product having improved properties in the treatment of cellulosic materials such as cotton in order to render the same fire-resistant.

EXAMPLE 8

A treatment was carried out similarly to Example 1 employing butyric acid in 100% concentration and in 50% concentration with water for the treatment of the water-soluble, nitrogen-phosphorus-containing composition described above. The treatment was found to give a good yield of the modified product having improved flame-resistant properties in the treatment of cellulosic materials.

EXAMPLE 9

Monochloracetic acid was employed similarly to chloracetic acid as described in Example 1. It was found that a 50% solution of monochloracetic acid in water could readily be employed with the phosphorus-nitrogen condensation product either in solid form or in aqueous solution to give a superior product after removal of the acid.

EXAMPLE 10

Trichloracetic acid was employed similarly to acetic acid as described in Example 1. It was found that this acid could likewise be employed in 100% form or as an aqueous solution for the modification of the phosphorus-nitrogen condensation product to yield a composition useful in the flame-retardant treatment of cotton.

EXAMPLE 11

The use of oxalic acid in the modification of the phosphorus-nitrogen condensation product was shown by the addition of such condensation product as a white powder to a solution of one part of oxalic acid in an equal weight of water. It was found that a pasty composition resulted which could be extracted with methanol to remove the acid and water, leaving the modified phosphorus-nitrogen compound in a form having utility in the treatment of cotton for flame-proofing purposes. It was also found that a 40% solution of the phosphorus-nitrogen compound in water gave a readily filterable product when in contact with oxalic acid. Upon removal of the liquid the modified, residual solid material was found to have excellent properties in flameproofing treatment.

In general, the carboxylic acids having from 2 to 4 carbon atoms have been found to be useful in the process of the present invention. Such acids include acetic, propionic, and butyric acids. In addition to the monocarboxylic acids, it has also been found that substituted acids such as halogen derivatives and dicarboxylic acids also have utility for this purpose. For example, maleic, tartaric, malic, malonic and lactic acids may be employed for the treatment of the nitrogen-phosphorus compound.

What is claimed is:

1. In a process for the improvement of the fire-retardant properties of the water-soluble, ammonia-insoluble reaction product of one mole of phosphorus oxychloride and at least five moles of anhydrous ammonia, which reaction product is obtained by the preliminary heating of the said reactants at a temperature below 110° C., followed by heat-treatment thereof at a temperature in the range of 110° C. to 150° C., the improvement which comprises contacting the said reaction product with acetic acid to extract therefrom the acid-soluble components, and thereafter removing such soluble components to obtain the insoluble portion as a material of improved fire-retardant qualities.

2. In a process for the improvement of the fire-retardant properties of the water-soluble, ammonia-insoluble reaction product of one mole of phosphorus oxychloride and at least five moles of anhydrous ammonia, which reaction product is obtained by the preliminary heating of the said reactants at a temperature below 110° C., followed by heat-treatment thereof at a temperature in the range of 110° C. to 150° C., the improvement which comprises contacting the said product with propionic acid to extract therefrom the acid-soluble components, and thereafter removing such soluble components to obtain the insoluble portion as a material of improved fire-retardant qualities.

3. In a process for the improvement of the fire-retardant properties of the water-soluble, ammonia-insoluble reaction product of one mole of phosphorus oxychloride and at least five moles of anhydrous ammonia, which reaction product is obtained by the preliminary heating of the said reactants at a temperature below 110° C., followed by heat-treatment thereof at a temperature in the range of 110° C. to 150° C., the improvement which comprises contacting the said reaction product with butyric acid to extract therefrom the acid-soluble components, and thereafter removing such soluble components to obtain the insoluble portion as a material of improved fire-retardant qualities.

4. In a process for the improvement of the fire-retardant properties of the water-soluble, ammonia-insoluble reaction product of one mole of phosphorus oxychloride and at least five moles of anhydrous ammonia, which reaction product is obtained by the preliminary heating of the said reactants at a temperature below 110° C., followed by heat-treatment thereof at a temperature in the range of 110° C. to 150° C., the improvement which comprises contacting the said reaction product with a monocarboxylic acid having from 2 to 4 carbon atoms to extract therefrom the acid-soluble components, and thereafter removing such soluble components to obtain the insoluble portion as a material of improved fire-retardant qualities.

MORRIS L. NIELSEN.

References Cited in the file of this patent

UNITED STATES PATENTS

| Number    | Name         | Date          |
|-----------|--------------|---------------|
| 2,071,353 | Morgan       | Feb. 23, 1937 |
| 2,262,634 | Cobbs        | Nov. 11, 1941 |
| 2,286,308 | Rosser       | June 11, 1942 |
| 2,305,035 | Rosser       | Dec. 15, 1942 |
| 2,415,112 | Seymour et al. | Feb. 4, 1947 |
| 2,415,113 | Seymour et al. | Feb. 4, 1947 |
| 2,544,706 | Malowan      | Mar. 13, 1951 |